United States Patent
Riach et al.

(10) Patent No.: US 8,894,773 B2
(45) Date of Patent: Nov. 25, 2014

(54) SWEEPING MACHINE

(75) Inventors: Alan Bryson Riach, West Lothian (GB); Andrew Francis Robert Galashan, Midlothian (GB)

(73) Assignee: Tennant N.V. (NL)

( * ) Notice: Subject to any disclaimer, the term of this patent is extended or adjusted under 35 U.S.C. 154(b) by 596 days.

(21) Appl. No.: 13/062,545

(22) PCT Filed: Aug. 19, 2009

(86) PCT No.: PCT/EP2009/060712
§ 371 (c)(1), (2), (4) Date: Apr. 6, 2011

(87) PCT Pub. No.: WO2010/028937
PCT Pub. Date: Mar. 18, 2010

(65) Prior Publication Data
US 2011/0180104 A1    Jul. 28, 2011

(30) Foreign Application Priority Data
Sep. 9, 2008 (GB) ................................. 0816405.5

(51) Int. Cl.
| | |
|---|---|
| *E01H 1/05* | (2006.01) |
| *E01H 1/08* | (2006.01) |
| *G01C 21/34* | (2006.01) |
| *B08B 1/04* | (2006.01) |
| *B60L 11/18* | (2006.01) |
| *E01H 1/00* | (2006.01) |

(52) U.S. Cl.
CPC .............. *E01H 1/00* (2013.01); *G01C 21/3469* (2013.01)
USPC .................................. 134/18; 134/6; 134/21

(58) Field of Classification Search
CPC ............ E01H 1/04; E01H 1/05; E01H 1/053; E01H 1/056; E01H 1/0827; G01C 21/3469
USPC ....................................... 134/18, 21; 15/340.3
See application file for complete search history.

(56) References Cited

U.S. PATENT DOCUMENTS

| | | | |
|---|---|---|---|
| 5,539,399 | A | 7/1996 | Takahira |
| 5,815,824 | A | 9/1998 | Saga |
| 2003/0006914 | A1 | 1/2003 | Todoriki |

FOREIGN PATENT DOCUMENTS

| | | |
|---|---|---|
| DE | 19519107 | 4/1996 |
| GB | 2420813 | 6/2006 |

(Continued)

OTHER PUBLICATIONS

Machine translation: JP2006285547A, Kajitani et al. Oct. 2006.*

(Continued)

*Primary Examiner* — Michael Kornakov
*Assistant Examiner* — Natasha Campbell
(74) *Attorney, Agent, or Firm* — Fredrikson & Byron, P.A.

(57) ABSTRACT

A method of operating a sweeping machine, including a battery, a positioning receiver, a battery charge monitoring system and a computer, and having a cleaning and a transport mode of operation The method comprising the steps of: a) providing the computer with the location of a charging station, b) using the positioning receiver to provide the computer with the location of the sweeping machine, c) using the computer to provide an estimate of an amount of energy required to drive the sweeping machine from its location to the charging station in the transport mode, d) using the battery charge monitoring system to provide the computer with the amount of energy remaining in the battery, e) using the computer to compare the estimate with this amount of energy, and f) providing an operator notification when the amount of energy remaining in the battery falls below a predetermined amount of the estimate.

13 Claims, 2 Drawing Sheets

(56) References Cited

FOREIGN PATENT DOCUMENTS

Figure 1:
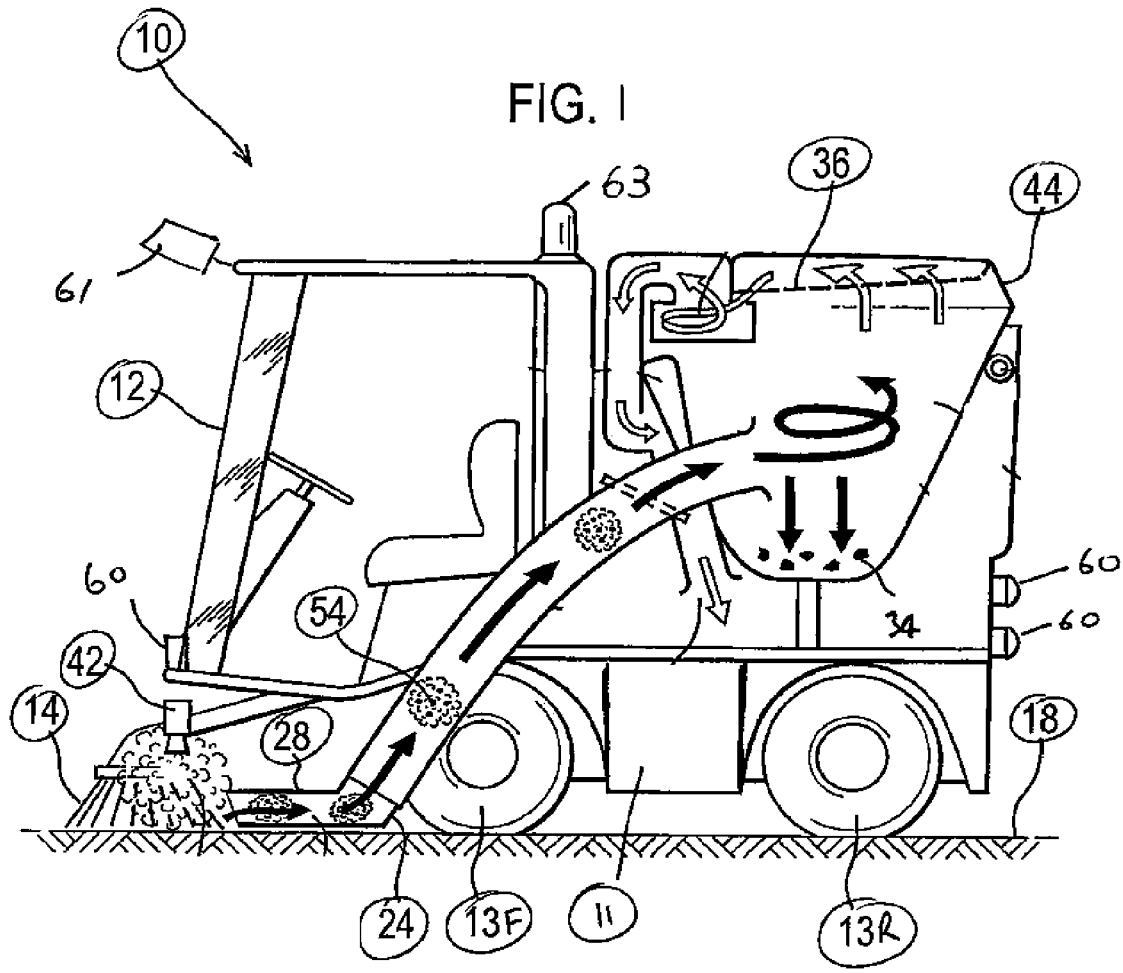

| JP | 2006285547 A | * | 10/2006 |
| --- | --- | --- | --- |
| WO | 03/046291 | | 6/2003 |
| WO | 2004/081289 | | 9/2004 |
| WO | 2004/103801 | | 12/2004 |
| WO | 2006/061602 | | 6/2006 |

OTHER PUBLICATIONS

International Search Report and Written Opinion, dated Oct. 14, 2009 for corresponding PCT Application No. PCT/EP2009/060712 (5 pages).

English-language abstract DE19519107 (Daimler Benz AG), Apr. 4, 1996.

* cited by examiner

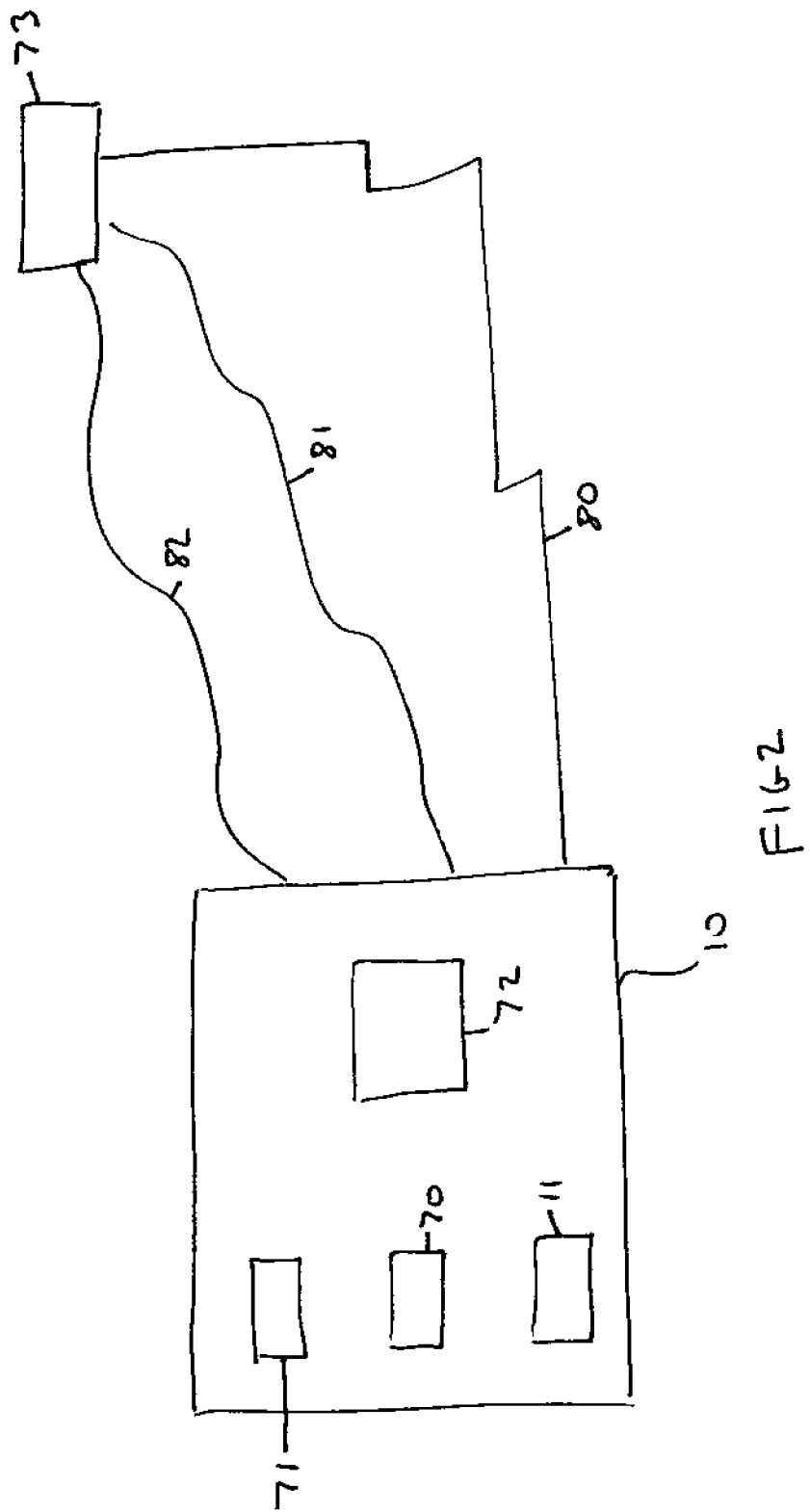

SWEEPING MACHINE

CROSS-REFERENCE TO RELATED APPLICATIONS

The present application claims priority to International Application No. PCT/EP2009/060712 filed Aug. 19, 2009, which in turn claims priority to UK Application No. 0816405.5 filed Sep. 9, 2008, the teachings of which are incorporated herein by reference.

The present invention relates to sweeping machines, and in particular a method of operating a battery powered sweeping machine.

Road sweeping machines are known which comprise a four wheeled vehicle with a cab at its front end, behind which is located a refuse hopper capable of taking up to approximately a tonne of swept up rubbish or other material. Such machines have steerable front and/or rear wheels controlled from the cab. They further include a pair of contra rotating brushes, extending in front of the cab and visible to the operator within the cab. The brushes are able to sweep a width varying from about 1.0 to 2.5 meters, the width of which can be controllable from the cab. The machines are normally provided with a suction arrangement to pick up rubbish swept to a central location between the contra rotating brushes and transport it to a hopper. Some sweeping machines include dust separation equipment to separate out dust from the exhaust air stream of the suction arrangement. Typically, the sweeping machines are powered by an internal combustion engine, which constitutes the primary power source.

Alternative road sweeping machines are known which include a cylindrical brush rotated about a horizontal axis that flicks the debris and rubbish onto an elevator system which then transports the rubbish into a hopper.

The machines will include electrically powered ancillary equipment such as electronic control systems for reducing the operator workload, heated windscreens, windscreen wipers, screen washer water pump, air conditioning, internal cab lights, external lights required by law to operate the vehicle on a public highway such as headlights, tail lights, fog lights, right hand indicator lights, left hand indicator lights, reversing lights etc. The machine may also include lights associated with operating the machine whilst sweeping, such as ground illuminating lights to illuminate the ground immediately in front of the contra rotating brushes. The sweeping machine may also include lights to illuminate the rear part of the vehicle, for example when the hopper is being emptied.

Such electrical components will be powered by a battery (typically a 12 volt battery) which in turn is recharged by an alternator driven by the internal combustion engine.

Examples of prior art sweeping machines are shown in WO2006/061602, WO03046291 and WO2004/081289.

Sweeping machines are often used by local government authorities to sweep public highways, pedestrian precincts, footpaths, car parks etc. They are often used as part of a shift system, i.e. an operator will drive a sweeping machine from a central depot to a remote location, clean the roads, footpaths etc of that remote location and then return to the central depot at the end of the working shift. When an internal combustion engine is being used as the primary power source of energy, the fuel (typically petrol or diesel) is compact and it is easy to ensure the vehicle has sufficient fuel to easily complete a working shift and return to the central depot. In the event that the operator inadvertently does not top up the fuel tank prior to leaving the depot and then runs out of fuel, it is easy to replenish the fuel tank with fuel by using a five liter fuel can or the like.

However, when the primary power source (i.e. the only power source) of the vehicle is a battery, because batteries are both bulky and heavy, under certain circumstances it is difficult to provide sufficient battery energy to complete a working shift. Furthermore, in the event that the batteries become depleted during a shift, it is not easy to recharge those batteries when the vehicle is remote from the central depot. The vehicle can therefore become stranded and will typically require towing back to the central depot.

As such, it is necessary to provide a system in which the likelihood of a battery powered sweeping machine becoming stranded remote from its normal charging point (e.g. the central depot) is minimised.

Thus, according to the present invention there is provided a method of operating a sweeping machine, the sweeping machine including a battery for powering a rotating brush system, a dirt transportation system for transporting brushed dirt into a hopper and a transmission system, the sweeping machine having a cleaning mode of operation where one or both of the rotating brush system and dirt transportation system is operating and a transport mode of operation where neither of the rotating brush system and dirt transportation system are operating, the sweeping machine further including a positioning receiver for monitoring the location of the sweeping machine, a battery charge monitoring system for monitoring an amount of energy remaining in the battery and a computer, the method comprising the steps of:

a) providing the computer with the location of a charging station, b) using the positioning receiver to provide the computer with the current location of the sweeping machine, c) using the computer to provide an estimate of an amount of energy required to drive the sweeping machine from its current location to the charging station in the transport mode, d) using the battery charge monitoring system to provide the computer with the current amount of energy remaining in the battery, e) using the computer to compare the estimate with the amount of energy remaining in the battery, and f) providing an operator notification when the amount of energy remaining in the battery falls below a predetermined amount of the estimate.

Advantageously, such a method reduces the likelihood of a sweeping machine powered by "zero emissions" technology becoming stranded away from its depot. A "zero emissions" vehicle is one which does not burn fossil fuels or the like in an internal combustion engine or the like and hence does not produce consequential pollutants.

The invention will now be described, by way of example only, with reference to the accompanying drawings in which: —

FIG. 1 is a side view of a sweeping machine operated by the method of the present invention and FIG. 2 is a schematic view of the sweeping machine of FIG. 1 and associated components.

FIG. 1 shows a side cutaway view of a sweeping machine 10 operated by the method of the present invention. The sweeping machine includes a cab 12 within which an operator sits. An electric motor (not shown) powered by batteries 11 drives the rear wheels 13R to move the sweeping machine across the ground 18.

The sweeping machine includes a pair of contra-rotating brushes 14 which sweep dirt, litter and the like into a central location for collection by nozzle 28 of hose 24. A fan 36 creates a partial vacuum in hopper 44 thereby causing the litter and dust 54 to be sucked through nozzle 28 and up hose 24 into the hopper 44. The fan, nozzle and hose therefore act as a transportation system for transporting brushed dirt into the hopper. In alternative embodiments the transportation system for transporting brushed dirt into a hopper can be in the form of an elevator onto which dirt and rubbish is swept by brushes, the elevator than transporting the dirt and rubbish into the hopper.

A separating system allows the litter to be separated into heavy particulates 34 which collect in the bottom of the hopper 44 and dust, which is collected via a separate filtration system (not shown). A water sprayer 42 sprays water onto the litter just prior to it entering the nozzle 28. Water droplets come into contact with dust thereby making it easier to extract dust from the air.

In this case, the only power source of the vehicle is the batteries 11. In particular, the batteries 11 power the following items: — the electric motor which drive the rear wheels 13R,
the electric motor which drives the contra-rotating brushes 14,
the electric motor which drives the fan 36,
the electric pump which provides pressurised water to the water sprayer 42.

The sweeping machine 10 includes ancillary equipment such as a heated windscreen, air conditioning, internal cab lights, external lights 60 required by law to operate the vehicle on a public highway, windscreen wipers etc.

The sweeping machine has a transport mode of operation and a cleaning mode of operation.

When in the transport mode of operation, fan 36 will be switched off. The brushes 14 will not be rotating and will be lifted away from the ground 18. The nozzle 28 will be lifted away from the ground. The external ground illuminating light 61 will be turned off. Clearly, during the transport mode of operation no cleaning of the road surface occurs and this mode of operation is typically used when an operator drives the vehicle from a central depot to a location which requires cleaning. When operating in the transport mode, the vehicle will typically be driven at the vehicle's maximum speed (bearing in mind any local speed restrictions), in order for the operator to reach the destination requiring cleaning as soon as possible.

Once the operator has reached the destination then the machine can be operated in its cleaning mode, i.e. fan 36 is turned on, the nozzle 28 is lowered, the brushes 14 are lowered and driven so as to contra-rotate and sweep litter etc and the water sprayer 42 is turned on if required. Under poor light conditions the ground illuminating lights 61 may be turned on and the warning light 63 may be turned on indicating a slow moving vehicle.

The power consumption of various motors when the vehicle is operating the transport mode or the cleaning mode is as shown in table 1.

TABLE 1

|  | Transport Mode of Operation | Cleaning Mode of Operation |
| --- | --- | --- |
| Brush Motor | 0 | 1 Kw-1.4 Kw |
| Fan Motor | 0 | 2.5 Kw-3.5 Kw |
| Wheel Motor | 2 Kw-4 Kw | 2 Kw-3 Kw |
| Ancillaries | 0.2 Kw | 0.3 Kw-0.5 Kw |

Table 2 below shows the typical energy consumption of the various electrical components during an 8 hour working shift (assuming 0.5 hour drive from the base to the area to be cleaned, 7 hours of cleaning and a 0.5 hour drive to return to base).

TABLE 2

| Wheel Motor (when operating in transport mode) | 3 Kw hr | Total 3.2 Kw hr or 6% of total energy consumption. |
| --- | --- | --- |
| Ancillaries (when operating in transport mode) | 0.2 Kw hr | |
| Wheel Motor (when operating in cleaning mode) | 17.5 Kw hr | Total 49.7 Kw hr or 94% of total energy consumption. |
| Brush Motor | 8.4 Kw hr | |
| Fan Motor | 21 Kw hr | |
| Ancillaries (when operating in cleaning mode) | 2.8 Kw hr | |
| TOTAL | 52.9 Kw hr | |

It can be seen from table 1 and 2 that a significant amount of energy (94% of total usage) is used during cleaning, and only a small portion of the available energy (6% of total usage) is used when the vehicle is in transport mode driving to or from the location to be cleaned. This can be contrasted with operation of battery powered cars (automobiles) where virtually all of the battery energy available is used in moving the vehicle and its occupants from one location to another. Only a very small proportion of battery energy available in cars is used on ancillary equipment such as lights etc.

Because sweeping machines use such a high proportion of the available battery energy during cleaning, it is easy for the operator to operate the sweeping machine in cleaning mode such that there is insufficient energy available to return the sweeping machine, in transport mode, to the central depot where the batteries can be recharged.

Consideration of FIG. 2 shows various features associated with operating a sweeping machine according to a method of the present invention. The sweeping machine 10 includes batteries 11 and battery monitoring system 70 which monitors the amount of energy remaining in the battery at any particular time. The sweeping machine also includes a GPS system 71 which determines the location of the sweeping machine 10. The GPS system provides the location of the sweeping machine to computer 72. The computer can be a typical general purpose computer comprising a processor and memory or may, as another example, be multiple computers, networked together with multiple processors and/or memories. The battery monitoring system 70 provides the amount of energy remaining in the battery to the computer. The amount of energy remaining can either be measured by the battery monitoring system, or it can be estimated by the battery monitoring system. The computer 72 has also been programmed with the location of a charging station 73, i.e. a place where the batteries 11 can be recharged. Typically the charging station will be the central depot which the vehicle departs from at the start of each shift and returns to at the end of each shift.

The computer 72 is also programmed with the operating characteristics of the sweeping machine in transport mode. Knowing the current position of the sweeping machine and the location of the charge station the computer can estimate an amount of energy required to drive the sweeping machine from its current location to the charge station 73 in transport mode. The computer can compare this estimate with the amount of energy remaining in the battery. When the amount of energy remaining in the battery falls below a predetermined percentage of the estimate then the computer notifies the operator.

Typically the notification could be a visual notification such as a warning light, alternatively, and/or additionally the operator notification could be an audible notification, such as an alarm, buzzer etc. By providing such a notification, the operator can take appropriate action, typically ceasing to use the sweeping machine in its cleaning mode and driving the sweeping machine to the depot in its transport mode of operation. Thus, the chance of becoming stranded is significantly reduced.

If the operator notification occurs when the amount of energy remaining in the battery falls to an amount equivalent to the estimate, then if the operator immediately ceases cleaning and immediately drives the sweeping machine to the charging station 72 then, if the estimate is accurate, the vehicle will just reach the charging station.

However, preferably the operator notification occurs when the amount of energy remaining in the battery is slightly more than the estimate required to drive the sweeping machine to the depot. Thus, the operator notification can occur when the energy remaining in the battery falls to 110% of the energy required to return the vehicle to the depot. This gives a 10% safety margin. Other safety margin percentages can be used. In particular, because the battery monitoring system may estimate the amount of energy remaining in the battery and because the amount of energy required to drive the sweeping machine to the depot is only an estimate, the operator notification can occur when the energy remaining in the battery falls to 100% of the energy required to return the vehicle to the depot. Furthermore, the operator notification may occur when the energy remaining in the battery falls to 95% of the energy required to return the vehicle to the depot and under such circumstances, the vehicle may still be able to return to the depot if the amount of energy remaining in the battery was estimated on the low side and the amount of energy required to drive the sweeping machine to the depot was estimated on the high side. However, when the operator notification occurs when the energy remaining in the battery falls to 95% of the energy required to return the vehicle to the depot there is a significant risk of the sweeping machine becoming stranded.

The ability to recharge certain types of battery fully, and the number of times such batteries can be recharged can be affected by how they are used, in particular by the level to which the batteries are discharged. By way of example, a battery which is fully charged between shifts and is only discharged by 80%, i.e. is discharged to a level where 20% of the fully charged energy remains may be recharged 2000 times during its useful life. Following this, the battery will progressively cease to take full charge.

Alternatively, the same battery if fully discharged on each shift it will only be able to be recharged 1000 times before it ceases to take full charge.

In other words, there is a discharge level below which the subsequent performance of a battery will be affected. Discharging the battery to below this level is known as "deep" discharge.

Thus, the present invention can be operated such that an operator notification is given in good time to ensure that when the sweeping machine reaches the central depot the batteries have not been "deep discharged". Thus, for example the operator notification can occur when the amount of energy remaining in the battery falls below 120% of the estimate of the amount of energy required to return the sweeping machine to the central depot. As such, by the time the sweeping machine arrives at the central depot there will be 20% charge still remaining in the battery and the battery will not be "deep discharged" thereby ensuring that the battery will maintain a full operating life.

As mentioned above, the computer is able to estimate an amount of energy required to drive the sweeping machine from its current location to a central depot in transport mode. There are various ways of providing this estimate, but clearly the better the estimate then the more cleaning can occur in any particular shift without the sweeping machine becoming stranded.

One way of providing an estimate is to compute a straight line distance between the present location and the central depot. It may not always be possible to drive the vehicle in a straight line from its current location to the central depot. For example, where the sweeping machine is operating in a location with roads orientated in a grid fashion, the operator notification may occur when the sweeping machine is, say, 1 mile south and 1 mile west of the central depot. Whilst the straight line distance is approximately 1.4 miles, the actual required distance the sweeping machine must travel is 2 miles. As such, one way of estimating the amount of energy required to return the sweeping machine to the central depot is to determine the straight line distance, multiply this by say 1.4 to estimate an actual distance to be driven by the sweeping machine and then calculate an amount of energy to travel this distance knowing the operating parameters of the sweeping machine.

A more accurate way of determining the distance to be travelled by the sweeping machine is to provide the computer with a map showing the current location of the sweeping machine, the location of the central depot and a route 80 between the sweeping machine and the central depot. By knowing a particular route 80, the computer can more accurately determine the actual distance to be travelled by the sweeping machine and can therefore determine a more accurate estimate of the amount of energy required to return to the central depot.

A yet more accurate method is to additionally determine the altitude of the sweeping machine in its present location and to determine the altitude of the central depot. Clearly, if the altitude of the central depot is higher than the altitude of the sweeping machine at its current location then more energy will be required to return the sweeping machine to the central depot than when the altitude of the sweeping machine at its current location is above the altitude of the central depot.

Where a map is provided, the computer can determine a route which uses the minimum amount of energy. Such a route maybe different to the quickest route or the shortest route. Things which effect the amount of energy used to drive along a particular route are: —
 a) the total height gain and the total height loss,
 b) the amount of acceleration and/or braking required,
 c) the time taken
 d) the distance travelled
 e) the likely speed of the travel
 f) the number of starts and stops.

By way of example, consider the scenario where the current position of the sweeping machine and the central depot are at the same altitude. The shortest route may include significant total height gain and equivalent total height loss. Due to inefficiencies, a battery vehicle will use more energy driving up say one side of the hill and down the other side to its final location than by driving an equivalent distance along the flat. Similarly, if the quickest route is used the vehicle may be travelling at a speed where it is less efficient. As such a route that takes a longer time to drive, but wherein the sweeping machine is being driven at a more efficient speed may result in less energy being used.

However, when the vehicle is being driven at night, it is necessary to ensure that the road lights are turned on in which case the quickest route may also be the route which uses least energy overall since the lights would be turned on for less time.

Knowing the operating conditions of the sweeping machine, the various route options (80, 81, 82), the altitude of the road at each part of the route, and the likely ancillary electrical equipment load requirement (especially lighting), the computer can determine a route which will return the sweeping machine to the central location using the least amount of energy.

When the computer has determined such a route, then this route can be displayed or otherwise communicated to the operator to allow the operator to follow the "minimum energy" route.

As mentioned above, an operator notification is provided when battery levels are becoming critical. Additionally it is possible to disable functions of the sweeping machine not directly associated with returning the sweeping machine to the central depot. For example, when the battery level becomes critical the rotating brush system or the vacuum dirt collection system could be disabled. This would prevent the operator from continuing to operate the machine in its cleaning mode and would therefore incentivise the operator to return the central depot. Where a water sprayer is fitted to the sweeping machine, this could be disabled. Where an air conditioning system is fitted this could be disabled to save energy. Clearly, when the sweeping machine is used on public roads, it would be necessary to ensure that electrical equipment, such as lights which are required by law to operate would not be disabled.

When battery levels are becoming critical, it could be possible to modify the performance of the sweeping machine to ensure that it is operated in a more efficient manner when returning to the central depot.

Thus, for example, if the normal top speed of the vehicle in transport mode is 30 mph, it would be possible to limit this top speed, for example to 25 mph. This would ensure that the sweeping machine was operated at a more efficient level to save energy. Additionally, or alternatively the maximum acceleration of the sweeping machine could be restricted thereby preventing the wasting of energy.

The invention has been described above in relation to a GPS system. Clearly, any system that enables the current location of the sweeping machine to be identified could be used with the present invention. Thus, any global navigation satellite system (GNSS) could be used. Alternatively, the position of the sweeping machine could be determined by a cell phone tower triangulation system. Thus, any positioning receiver could be used to provide the computer with the current location of the sweeping machine.

The invention claimed is:

1. A method of operating an operator driven road-going sweeping machine, the sweeping machine including a battery for powering a rotating brush system, a dirt transportation system for transporting brushed dirt into a hopper and a transmission system,
the sweeping machine having a cleaning mode of operation where at least one of the rotating brush system and dirt transportation system is operating and a transport mode of operation where neither of the rotating brush system and dirt transportation system are operating,
the sweeping machine further including a positioning receiver for monitoring the location of the sweeping machine, a battery charge monitoring system for monitoring an amount of energy remaining in the battery and a computer,
the method comprising the steps of:
a) providing the computer with the location of a charging station,
b) using the positioning receiver to provide the computer with the current location of the sweeping machine,
c) while the sweeping machine is operating in cleaning mode, using the computer to provide an estimate of an amount of energy required to drive the sweeping machine from its current location to the charging station in the transport mode,
d) using the battery charge monitoring system to provide the computer with the current amount of energy remaining in the battery,
e) using the computer to compare the estimate with the amount of energy remaining in the battery, wherein when the amount of energy remaining falls below the predetermined amount of the estimate, operation of at least one of a rotating brush system and a dirt transportation system is disabled, and
f) providing an operator notification when the amount of energy remaining in the battery falls below a predetermined amount of the estimate, wherein the notification comprises a visual and/or audible notification.

2. The method as defined in claim 1 in which the dirt transportation system is one of a vacuum system and a elevator system.

3. The method as defined in claim 1 in which the predetermined amount of the estimate is at least 100% of the estimate.

4. The method as defined in claim 1 in which the predetermined amount of the estimate is at least 110% of the estimate.

5. The method as defined in claim 1 in which the predetermined amount of the estimate is at least 120% of the estimate.

6. The method as defined in claim 1 in which the predetermined amount of the estimate is at least 130% of the estimate.

7. The method as defined in claim 1 including the step of providing the computer with a map showing a route from the current location to the charging station,
wherein the estimate is based on using the route.

8. The method as defined in claim 1 including
providing the computer with the altitude of the current location of the sweeping machine,
providing the computer with the altitude of the charging station, and
wherein the estimate is based on the difference in altitudes of the current location and the charging station.

9. The method as defined in claim 1 including the step of providing the computer with a map showing a plurality of routes from the current location to the charging station, using the computer to estimate an amount of energy required to drive the sweeping machine from its current location to the charging station in the transport mode via each of the plurality of routes, and indicating to an operator the route estimated to require the least amount of energy.

10. The method as defined in claim 9 wherein the computer provides instructions to an operator to take the route estimated to require the least amount of energy.

11. The method as defined in claim 1 in which, when the amount of energy remaining falls below the predetermined amount of the estimate, the maximum speed of the sweeping machine when operating in the transport mode is limited.

12. The method as defined in claim 1 in which, when the amount of energy remaining falls below the predetermined amount of the estimate, the maximum acceleration of the sweeping machine when operating in the transport mode is limited.

13. The method as defined in claim 1 wherein the current location of the sweeping machine is determined using a GPS system.

* * * * *